3,344,627
CUTTING DEVICE
Dieter Braun, Doffingen, Wurttemberg, Germany, assignor to Fortuna-Werke Spezialmaschinenfabrik A.G., Stuttgart-Bad Cannstatt, Germany
Filed Aug. 5, 1965, Ser. No. 477,391
Claims priority, application Germany, Aug. 8, 1964, F 43,703
11 Claims. (Cl. 69—10)

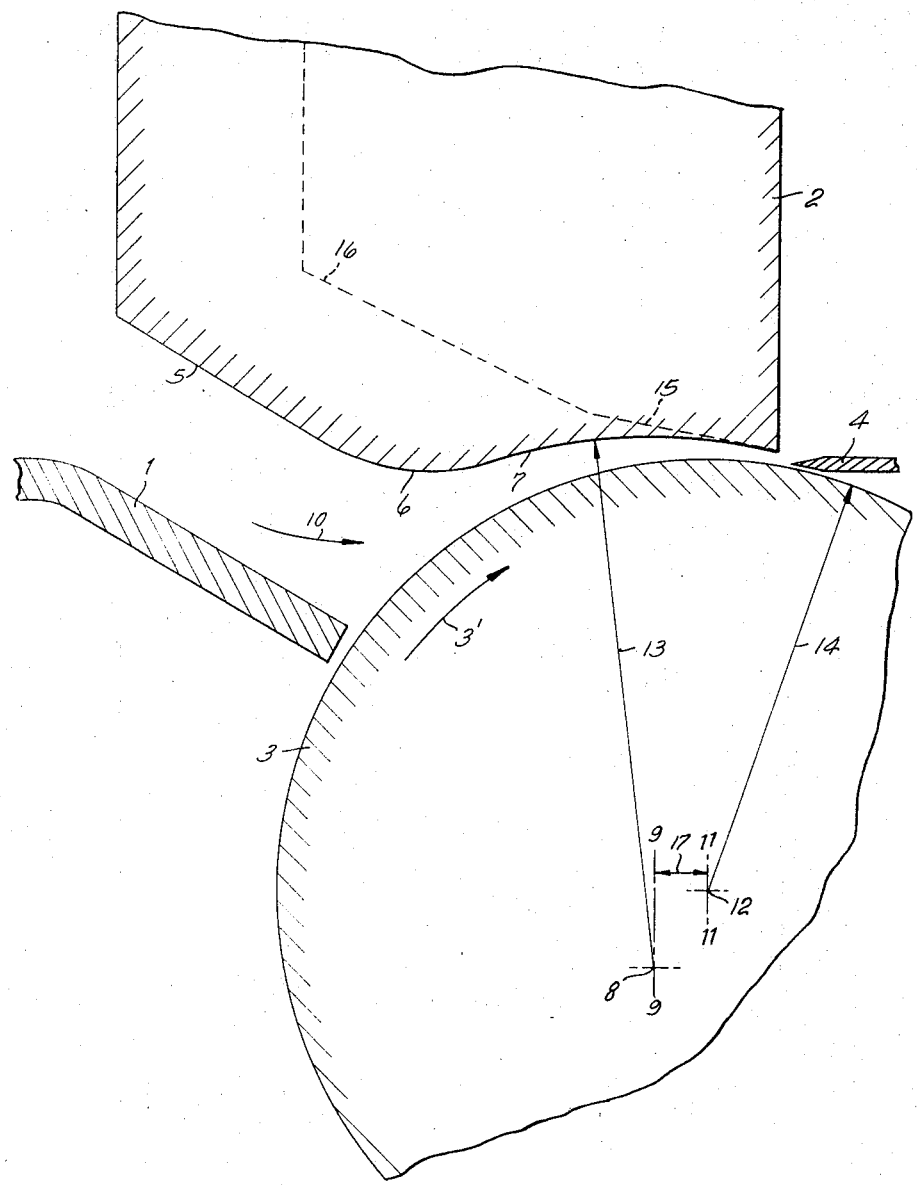

ABSTRACT OF THE DISCLOSURE

A cutting device which includes a traveling guide member and a stationary guide member. One of these guide members has a convex guide surface and the other has a concave guide surface and between themselves these guide surfaces define a gap decreasing in width in the direction of travel of the traveling guide member. A cutting member extends across this gap and has a cutting edge facing the same so that material which passes through the gap is slit by the cutting edge.

---

The present invention relates to a cutting device. More specifically the invention relates to a cutting device for slitting leather and like materials.

Still more specifically, the invention relates to a cutting device in which guide surfaces define a gap through which material to be slitted advances into engagement with the cutting edge of a driven cutting member.

Cutting devices of the type set forth above generally utilize driven belt-type cutting members against whose cutting edge the material to be slitted is advanced transversely of the direction of travel of the belt-type cutter. To achieve a clean cut it is of course necessary that the material to be slitted be firmly guided at all times. For this reason, the material passes between a stationary guide member and a rotary guide member, which together define the gap through which the material travels into contact with the cutting edge of the cutter; the rotary guide member at the same time serves to entrain the material so as to press it into engagement with the aforesaid cutting edge. The rotary guide member is generally of cylindrical outline, and the stationary member comprises a first guide surface extending at an angle of approximately 10 degrees to a horizontal plane passing through the axis of the cylinder, and a second guide surface extending tangentially to the periphery of the cylindrical rotary member and defining therewith a gap of decreasing width terminating directly ahead of the cutting edge of the cutting member. The general arrangement of one such prior-art construction is disclosed in the co-pending application of Dieter Braun et al., entitled, "Cutting Device," Ser. No. 472,368, filed on July 15, 1965, and assigned to the same assignee as this present application.

Although generally operable, constructions of this type have the disadvantage that very thick pieces of material, that is pieces from which thick layers are to be sliced off by the cutting means, are not flexible enough to follow the relatively abrupt bend as the first surface portion of the stationary guide member, that is the portion which extends substantially radially to the cylindral guide member, merges into the tangentially extending second surface portion. In other words, the angle between the substantially radially extending first surface portion and the tangentially extending second surface portion is too pronounced and the material or workpiece will become jammed with its leading edge between the surface of the rotary cylindrical guide member and the surface of the stationary guide member. This requires corrective action by the machine operator, so as to cause the material to be again advanced toward the cutter means, and may even require shutting down of the machine to remove jammed material therefrom.

Another disadvantage of this construction lies in the fact that if the workpiece is so close to the desired tolerance as to require very little removal of material by the cutter means, then the zone in which it is compressed between the stationary guide means and the rotary guide means and thus entrained by the latter is too short, so that the entraining action of the rotary guide means is not strong enough to overcome the cutting pressure, that is the resistance of the material to penetration of the cutting edge of the cutting means.

It is therefore a general object of the present invention to overcome the aforementioned drawbacks.

A more specific object of the present invention is to provide a cutting device of the type described wherein the angle at which the first surface portion of the stationary guide means merges into the second surface portion is less abrupt than heretofore known.

Another object of the present invention is to provide a guide means of the above-mentioned type wherein the zone in which the workpiece is in frictional engagement with the rotary guide means and the stationary guide means is increased in length, so as to enable the entraining force of the rotary guide means to overcome the resistance of the material to penetration by the cutting edge of the cutting means.

In accordance with one object of the present invention I provide, in a cutting device, particularly a cutting device for splitting leather and similar materials, the combination of a travelling guide member having a convex guide surface; a stationary guide member having a concave guide surface, both of these guide surfaces defining between themselves a gap decreasing in the direction of travel of the travelling guide member; and cutting member which is located across the gap and has a cutting edge facing the gap, so that leather and like materials which pass through the gap into contact with the cutting member are slit by the cutting edge.

Naturally, the travelling guide member mentioned above need not be a rotary guide member but could also be of the endless-belt type. Similarly, the cutting member need not, as outlined in the introductory comments, be of the rotating-belt type, but could be of any other suitable construction well known in the art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

The single figure is a sectional elevational view of an arrangement in accordance with the present invention.

Reference numeral 1 designates a first stationary guide means which is substantially planar and extends substantially radially of the travelling guide means 3 which in the drawing is shown as a cylindrical body rotating about an axis 12 in the direction of the arrow 3'. A second, stationary guide means generally indicated with reference numeral 2 is positioned adjacent the travelling guide means 3 and comprises a substantially planar surface portion 5 which extends substantially parallel to the surface of the first stationary guide means 1, and thus also extends substantially radially to the travelling guide means 3. The stationary guide means 2 further comprises a second surface portion 6 which is convex and into which the surface portion 5 gradually merges. Surface portion 6 may have its lowest point arranged downwardly of the cutting edge of the cutting means 4. Convex surface portion 6 in turn gradually merges into a concave surface portion 7 which defines a section of a cylinder. Surface portion 7 and the surface of travelling guide means 3 together define a gap which narrows in width in the direction of travel of guide means 3—and thereby of the material to be cut, whose travel is indicated by the arrow 10—and which has an open front end adjacent the cutting edge of cutting means 4.

The curvature of concave surface portion 7 is so selected that the cylinder defined by it has a radius 13 which is larger than the radius 14 of the travelling guide means 3. In accordance with the invention the axis 8 of the cylinder defined by concave surface portion 7 is situated in the plane 9—9 which is located rearwardly of the axis 12, located in the plane 11—11, of travelling guide means 3. It will be understood that "rearwardly" refers to the direction of travel of the material as indicated by arrow 10. The axes 8 and 12, and accordingly the planes 9 and 11, are spaced from one another in this manner by a distance indicated by the double-headed arrow 17 in the drawing.

The arrangement of the heretofore-common stationary guide means is indicated in the drawing in dashed lines, reference numeral 15 designating the tangential portion and reference numeral 16 designating the radial portion.

It will be clear from a comparison of the indicated prior-art construction with that now set forth in the drawing and the specification, that the inventive construction overcomes the drawbacks outlined in the introductory comments. The first surface portion 5 of the stationary guide means 2 still extends at an angle of approximately 10 degrees relative to a horizontal plane passing through the axis 12 of travelling guide means 3. However, the more remote location of this surface portion 5 from the guide means 3, and its gradual merging into the convex surface portion 6 and subsequently the concave surface portion 7, eliminates the relatively abrupt transition of surface portion 16 to surface portion 15 found in the prior-art constructions. In fact, the angle of transition is less than half of that known from the prior-art constructions so that the leading edges of thicker pieces of material are engaged much more gradually by the surface of traveling guide member 3 and are readily pulled into the gap defined between the surface of guide member 3 and the concave surface 7 of stationary guide member 2. On the other hand, the zone in which the material is subjected to frictional engagement between the two respective guide surfaces is now approximately twice as long as in prior-art constructions so that thinner material will be engaged over a much larger surface area, whereby the entraining force is enabled to overcome the resistance of the material to penetration of the cutting edge of cutting means 4.

It will be understood that each of the elements described above, or two or more together, may also find a useful application in other types of cutting devices differing from the types described above.

While the invention has been illustrated and described as embodied in a cutting device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features which, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a cutting device, particularly for splitting leather and like materials, the combination of a travelling guide member travelling in a predetermined direction; a stationary guide member, one of said guide members having a guide surface convexly curved in said predetermined direction and the other of said guide members having a guide surface concavely curved in said predetermined direction, and said guide surfaces defining between themselves a gap decreasing in width in said predetermined direction of travel of said travelling guide member; and a cutting member extending across said gap and having a cutting edge facing the same in the direction opposite said predetermined direction, whereby material which passes through said gap in said predetermined direction is slit by said cutting edge.

2. In a cutting device, particularly for splitting leather and like materials, the combination of a travelling guide member travelling in a predetermined direction and having a guide surface convexly curved in said predetermined direction; a stationary guide member having a guide surface concavely curved in said predetermined direction, said guide surfaces defining between themselves a gap gradually decreasing in width in said predetermined direction of travel of said travelling guide member; and a cutting member extending across said gap and having a cutting edge facing the same in the direction opposite said predetermined direction, whereby material which passes through said gap in said predetermined direction is slit by said cutting edge.

3. In a cutting device, particularly for splitting leather and like materials, the combination of a rotary guide member rotating in a predetermined direction and having a guide surface convexly curved in said predetermined direction; a stationary guide member having a guide surface concavely curved in said predetermined direction, said guide surfaces defining between themselves a gap gradually decreasing in width in said predetermined direction of rotation of said rotary guide member; and a cutting member extending across said gap and having a cutting edge facing the same in the direction opposite said predetermined direction, whereby material which passes through said gap in said predetermined direction is slit by said cutting edge.

4. In a cutting device, particularly for splitting leather and like materials, the combination of a rotary cylindrical guide member rotating in a predetermined direction and having a guide surface convexly curved in said predetermined direction; a stationary guide member having a guide surface concavely curved in said predetermined direction and defining a section of a cylinder, said guide surfaces defining between themselves a gap gradually decreasing in width in said predetermined direction of rotation of said rotary guide member; and a cutting member extending across said gap and having a cutting edge facing the same in the direction opposite said predetermined direction, whereby material which passes through said gap in said predetermined direction is slit by said cutting edge.

5. In a cutting device, particularly for splitting leather and like materials, the combination of a rotary guide member constituting a cylinder of a predetermined radius and rotating in a predetermined direction, said rotary guide member having a guide surface convexly curved in said predetermined direction; a stationary guide member having a concave guide surface and defining a section of a cylinder having a radius greater than said predetermined radius, said guide surfaces defining between themselves a gap gradually decreasing in width in said predetermined direction of rotation of said rotary guide member; and a cutting member extending across said gap and having a cutting edge facing the same in the direction opposite said predetermined direction, whereby material which passes through said gap in said predetermined direction is slit by said cutting edge.

6. The combination as defined in claim 5, wherein the axis of the cylinder defined by said rotary member is located rearwardly in the direction of rotation of said rotary member, of the axis of the cylinder defined by said stationary guide member.

7. In a cutting device, particularly for splitting leather and like materials, the combination of a rotary cylindrical guide member rotating in a predetermined direction, said rotary guide member having a guide surface convexly curved in said predetermined direction; a stationary guide member having a guide surface concavely turned in said predetermined direction and defining a section of a cylinder, said guide surfaces defining between themselves a gap gradually decreasing in width in said predetermined direction of rotation of said rotary guide member; and a belt-type cutting member extending across said gap and driven in a direction transversely to the direction of rotation of said rotary guide member, said cutting member having a cutting edge facing said gap, in the direction opposite said predetermined direction, whereby material which passes through said gap in said predetermined direction is slit by said cutting edge.

8. In a cutting device, particularly for splitting leather and like materials, the combination of a travelling guide member having a convex guide surface; a first stationary guide member having a substantially planar guide surface extending substantially radially to the periphrey of said convex guide surface; a second stationary guide member having a substantially planar surface portion located opposite said planar guide surface of said first stationary guide member with spacing therefrom, said substantially planar surface portion merging gradually into a convex surface portion and said convex surface portion in turn merging gradually into a concave surface portion which forms with said convex guide surface of said travelling guide member a gap of gradually decreasing width and having an open forward end; and a cutting member extending across said open forward end of said gap and having a cutting edge facing the same, whereby material which passes through said gap is slit by said cutting edge.

9. In a cutting device, particularly for splitting leather and like materials, the combination of a travelling guide member defining a first cylinder having a convex guide surface; a first stationary guide member having a substantially planar guide surface extending substantially radially to the periphery of said first cylinder; a second stationary guide member having a subtsantially planar surface portion located opposite said planar guide surface of said first stationary guide member with spacing therefrom, said substantially planar surface portion merging gradually into a convex surface portion and said convex surface portion in turn merging gradually into a concave surface portion which defines a section of a second cylinder and forms with said convex guide surface of said travelling guide member a gap of gradually decreasing width and having an open forward end; and a cutting member extending across said open forward end of said gap and having a cutting edge facing the same, whereby material which passes through said gap is slit by said cutting edge.

10. In a cutting device, particularly for splitting leather and like materials, the combination of a travelling guide member defining a first cylinder of a predetermined radius having a convex guide surface; a first stationary guide member having a substantially planar guide surface extending substantially radially to the periphery of said first cylinder; a second stationary guide member having a substantially planar surface portion located opposite said planar guide surface of said first stationary guide member with spacing therefrom, said substantially planar surface portion merging gradually into a convex surface portion and said convex surface portion in turn merging gradually into a concave surface portion which defines a section of a second cylinder of a radius greater than said predetermined radius and forms with said convex guide surface of said travelling guide member a gap of gradually decreasing width and having an open forward end; and a cutting member extending across said open forward end of said gap and having a cutting edge facing the same, whereby material which passes through said gap is slit by said cutting edge and one portion of the thus-slit material passes between said convex guide surface of said travelling guide member and said cutting member and the other portion of the thus-slit material passes between said concave surface portion of said second stationary guide member and said cutting member.

11. The combination as defined in claim 10, wherein said cutting member is an endless belt-type cutter, and is driven in a direction transversely to the direction of movement of said travelling guide member.

References Cited
UNITED STATES PATENTS

| | | | |
|---|---|---|---|
| 1,061,604 | 5/1913 | Gay | 69—10 |
| 1,981,944 | 11/1934 | Brostrom | 69—10 |
| 2,683,975 | 7/1954 | Remelius | 69—9.5 |
| 2,687,634 | 8/1954 | Beck | 69—9.5 |

FOREIGN PATENTS 623,995  8/1961  Italy.

PATRICK D. LAWSON, *Primary Examiner.*

A. R. GUEST, *Assistant Examiner.*